United States Patent
Etchason et al.

(10) Patent No.: US 7,223,205 B2
(45) Date of Patent: May 29, 2007

(54) METHOD FOR CONTROLLING ENGINE AND/OR TRANSMISSION TEMPERATURE

(75) Inventors: Edmond M. Etchason, New Palestine, IN (US); Joseph K. S. Johansson, Danville, IN (US); John P. Kresse, Martinsville, IN (US); Jeffrey E Shultz, Zionsville, IN (US); Mark A. Rushing, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 178 days.

(21) Appl. No.: 11/059,905

(22) Filed: Feb. 17, 2005

(65) Prior Publication Data
US 2006/0183596 A1    Aug. 17, 2006

(51) Int. Cl.
*F02D 35/00* (2006.01)
(52) U.S. Cl. .......................................... 477/98; 701/101
(58) Field of Classification Search ................ 477/98, 477/107; 701/54
See application file for complete search history.

(56) References Cited

U.S. PATENT DOCUMENTS

| | | | | |
|---|---|---|---|---|
| 4,391,246 A | * | 7/1983 | Kawabata et al. | 123/389 |
| 5,601,511 A | * | 2/1997 | Michioka | 477/98 |
| 2003/0216848 A1 | * | 11/2003 | Katrak et al. | 701/54 |
| 2004/0129251 A1 | * | 7/2004 | Kang et al. | 123/396 |

* cited by examiner

*Primary Examiner*—Richard M. Lorence
*Assistant Examiner*—Edwin A. Young
(74) *Attorney, Agent, or Firm*—Dan L. Thompson

(57) ABSTRACT

The method of the present invention is adapted to control transmission oil temperature. According to a preferred embodiment, the engine coolant temperature may be controlled in addition to or regardless of transmission oil temperature. To maintain transmission and/or engine temperature, the present invention is preferably configured to limit the engine's power when required to ensure the powertrain (engine and transmission) does not overheat.

20 Claims, 2 Drawing Sheets

METHOD FOR CONTROLLING ENGINE AND/OR TRANSMISSION TEMPERATURE

TECHNICAL FIELD

The present invention is drawn to a method for controlling engine and/or transmission temperature.

BACKGROUND OF THE INVENTION

Cooling for torque converter-equipped automatic transmissions is typically provided by a transmission heat exchanger that transfers the transmission oil heat to the engine coolant. Accordingly, transmission oil temperature is affected by engine coolant temperature, the engine cooling system's volume, and the engine cooling system's ability to reduce the additional transmission heat load. Similarly, engine coolant temperature is affected by transmission oil temperature, the engine cooling system's volume, and the engine cooling system's ability to reduce the additional transmission heat load.

It may be desirable to reduce the transmission oil temperature and/or engine coolant temperature beyond that which is possible with a given vehicle's engine cooling system. As an example, several systems adapted to reduce emissions (i.e., recirculating exhaust gas to reduce oxides of nitrogen) generate additional heat. For such systems, it may be advantageous to maintain transmission oil temperature and/or engine coolant temperature below a predetermined limit without increasing the engine cooling system's capacity.

SUMMARY OF THE INVENTION

The method of the present invention is adapted to control transmission oil temperature. According to a preferred embodiment, the engine coolant temperature may be controlled in addition to or regardless of transmission oil temperature. To maintain transmission and/or engine temperature, the present invention is preferably configured to limit the engine's power when required to ensure the powertrain (engine and transmission) does not overheat. The reduction of engine power is preferably accomplished, depending on engine type, by reducing the injected fuel quantity, reducing the air intake of the engine, or adjusting spark timing.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

A method of the present invention is preferably adapted to control the temperature of a vehicle's powertrain by limiting engine power as necessary to avoid overheating. For purposes of the present invention, "powertrain" is defined as including a vehicle's engine and transmission. Alternatively, the present invention may be adapted to control either a vehicle's transmission temperature or engine temperature individually, as will be described in detail hereinafter. The reduction of engine power is preferably accomplished by altering injected fuel quantity and/or air intake of the engine. It should be appreciated, however, that reduction of engine power may also be accomplished by adjusting spark timing.

Figure 1:
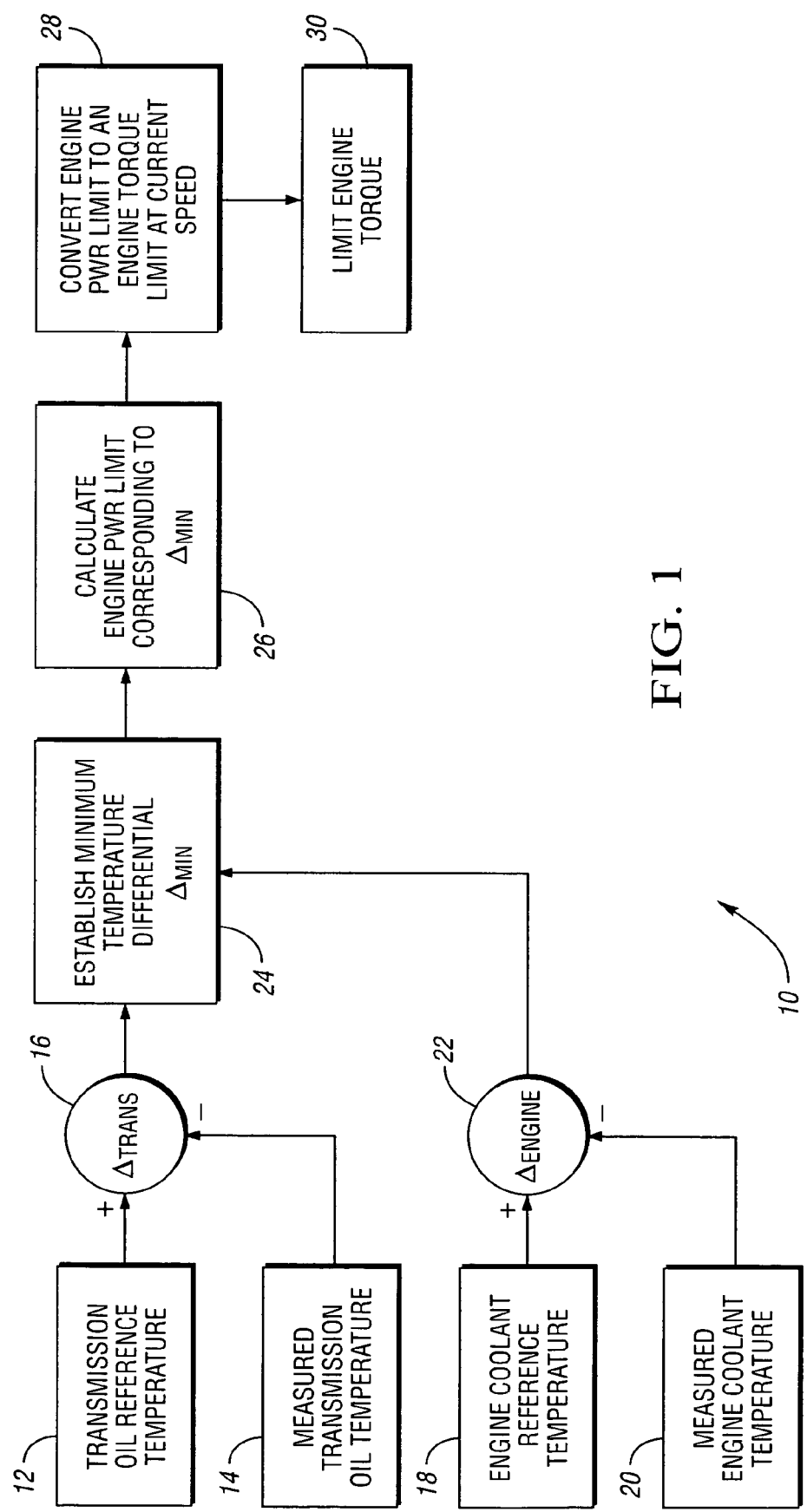
FIG. 1 is a block diagram illustrating a method according to a preferred embodiment of the present invention.

Referring to FIG. 1, a control algorithm 10 of the present invention is shown. The control algorithm 10 preferably resides in a transmission control module, or TCM (not shown), though could reside in any control module present on the vehicle with access to component temperature information and with the ability to reduce engine torque and/or power (i.e., via serial data communications link). The control algorithm 10 is adapted to limit the engine's output to prevent the transmission from overheating as described in detail hereinafter.

The control algorithm 10 includes a series of blocks 12–30 representing steps continuously evaluated by the TCM at an interval $\Delta_t$ (in a preferred embodiment $\Delta t$ is 0.025 seconds, however a wide range of possible values for $\Delta_t$ are envisioned). At step 12, a predetermined reference temperature for the transmission oil is established. The transmission oil reference temperature may differ depending on the application but generally represents the maximum allowable temperature for a particular transmission. At step 14, the current transmission oil temperature is measured. At step 16, a transmission oil temperature differential $\Delta_{trans}$ is calculated by subtracting the current transmission oil temperature from the reference transmission oil temperature.

The following steps 18–24 are optional but are implemented according to a preferred embodiment. At step 18, a predetermined reference temperature for the engine coolant is established. The engine coolant reference temperature may differ depending on the application but generally represents the maximum allowable temperature for a particular engine. At step 20, the current engine coolant temperature is measured. At step 22, an engine coolant temperature differential $\Delta_{engine}$ is calculated by subtracting the current engine coolant temperature from the reference engine coolant temperature.

According to a preferred embodiment, transmission temperature and engine temperature are both controlled as described hereinabove. It should, however, be appreciated that according to an alternate embodiment only transmission temperature is controlled, steps 18–24 are not performed, and a minimum temperature differential $\Delta_{min}$ (described in detail hereinafter) is set to the transmission oil temperature differential $\Delta_{trans}$. According to another alternate embodiment only engine temperature is controlled, steps 12–16 and 24 are not performed, and the minimum temperature differential $\Delta_{min}$ (described in detail hereinafter) is set to the engine coolant temperature differential $\Delta_{engine}$.

At step 24, the minimum temperature differential $\Delta_{min}$ is established by selecting the minimum of $\Delta_{trans}$ and $\Delta_{engine}$. At step 26, the minimum temperature differential $\Delta_{min}$ is converted to an engine power limit as will be described in detail hereinafter. In a preferred embodiment, step 28 is implemented to convert the engine power limit of step 26 to a torque limit. At step 30, the engine torque limit established at step 28 is preferably sent from the transmission control module to an engine control module (ECM, not shown) via a serial communications datalink (not shown). Additionally at step 30, the ECM preferably limits the current engine torque to a value equal to the engine torque limit of step 28.

Step 26 may be implemented in conjunction with any controller adapted to convert the minimum temperature differential $\Delta_{min}$ into an engine power limit. A simple example of such a controller would be an open loop controller configured to limit engine output by a predefined amount (e.g., 20 percent), whenever the minimum temperature differential $\Delta_{min}$ is below a predefined threshold. The predefined threshold is preferably a limit or trigger indicating that the powertrain should be cooled. This open loop control would therefore allow for maximum engine output if the powertrain is not in jeopardy of overheating (i.e., the minimum temperature differential $\Delta_{min}$ is above the predefined threshold), and would reduce engine output when the powertrain begins to overheat (i.e., the minimum temperature differential $\Delta_{min}$ is below the predefined threshold).

Figure 2:
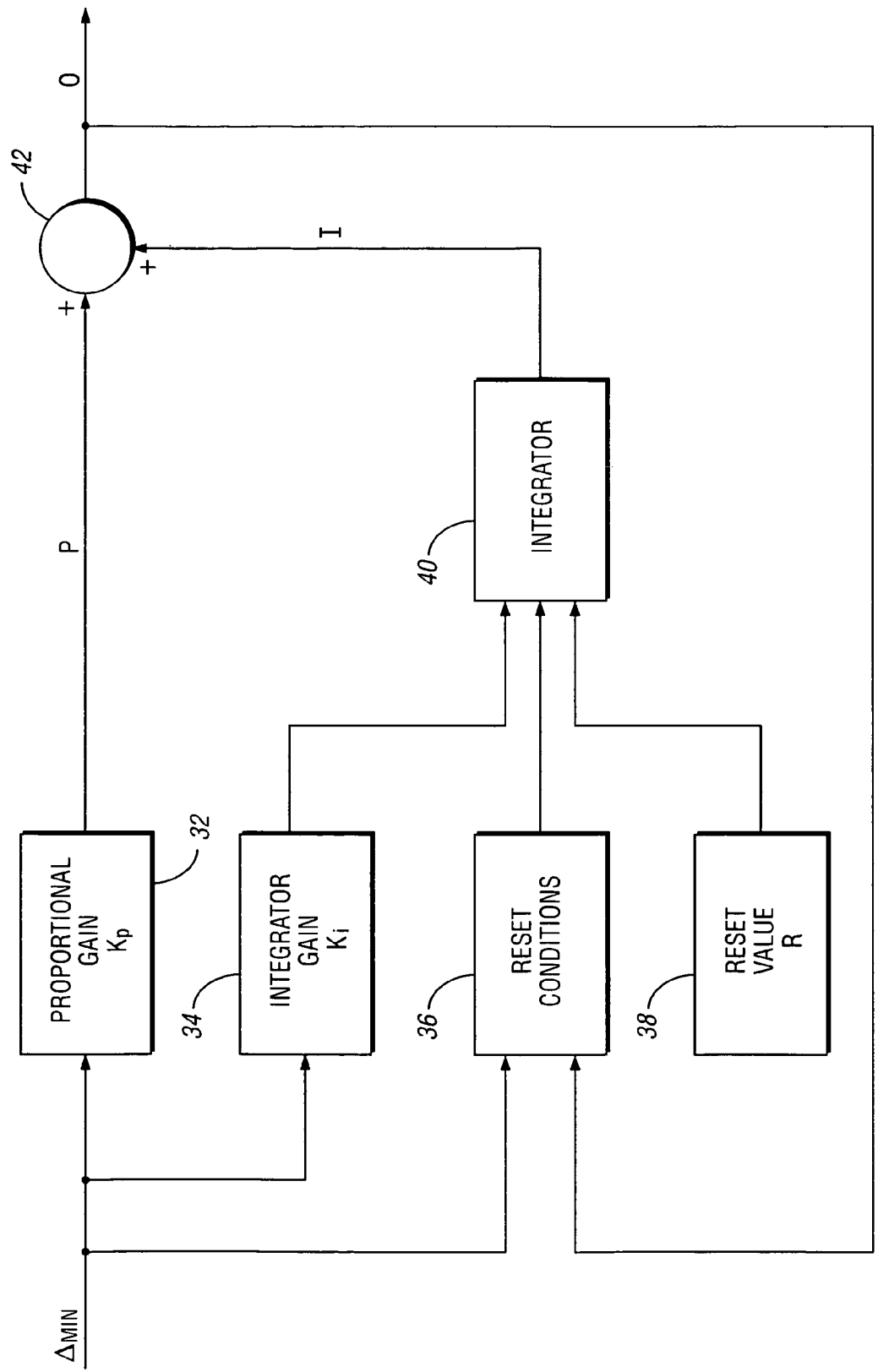
FIG. 2 is a block diagram illustrating a portion of the method of FIG. 1.

Referring to FIG. 2, a preferred embodiment of the present invention is shown. According to the embodiment of FIG. 2, step 26 is performed with a conventional closed loop control algorithm which may include, for example, a controller having proportional and integral control terms (PI controller) adapted to adjust the value of the engine power limit in response to the minimum temperature differential $\Delta_{min}$.

At step 32 of FIG. 2, the minimum temperature differential $\Delta_{min}$ is multiplied by a proportional gain $K_p$ to generate the proportional control term P. The proportional gain $K_p$ is configurable to accommodate different powertrain systems and represents a multiplication factor required to convert $\Delta_{min}$ into an engine power limit for the proportional control term P. At step 34, the minimum temperature differential $\Delta_{min}$ is multiplied by an integral gain $K_i$. The integral gain $K_i$ is also configurable to accommodate different powertrain systems and represents a multiplication factor applied to $\Delta_{min}$ which is then added to the accumulated value thereby creating the integral power control term I. At step 36, the algorithm 10 evaluates a reset condition as will be described in detail hereinafter. At step 38, the algorithm 10 establishes a reset value R. The reset value R is generally established by evaluating a particular vehicle's cooling system capacity, and preferably represents a reduced engine output value relative to that actually installed, selected to ensure that the vehicle's powertrain will not overheat under assumed worst case design conditions. At step 40, an integrator is applied to inputs from steps 34–38 to generate the integral control term I as will be described in detail hereinafter. At step 42, the proportional control term P is added to the integral control term I to generate an output O.

Step 36, wherein the algorithm 10 evaluates a reset condition, is preferably implemented to prevent integrator wind-up by resetting the integral control term I. As is known by one skilled in the art, integrator wind-up is a common phenomenon for integrators and must be addressed to avoid control system inaccuracy. Therefore, at step 36, if the minimum temperature differential $\Delta_{min}$ is less than a predetermined calibration value and the output O is greater than the reset value R, the algorithm 10 resets the integral control term I to the reset value R.

The integrator of step 40 is configured to generate the integral control term I in response to inputs from steps 34–38. More precisely, if the reset conditions of step 36 are met, the integrator sets the integral control term I to the reset value R. If the reset conditions of step 36 are not met, the integrator preferably generates the integral control term I according to the following equation:

$$I_t = K_i \times \Delta_{min} + I_{t-1}$$

where $I_t$ is the value of the integral control term at time t, $K_i$ is the integral gain, $\Delta_{min}$ is the minimum temperature differential, and $I_{t-1}$ is the previous value of the integral control term calculated during the last iteration of this equation. It should also be appreciated that when the above equation is run for the first time, the value of $I_{t-1}$ is undefined and is therefore set to the reset value R.

The steps shown in FIGS. 1–2 and described herein need not be performed in the order shown, unless otherwise indicated herein.

While the best modes for carrying out the invention have been described in detail, those familiar with the art to which this invention relates will recognize various alternative designs and embodiments for practicing the invention within the scope of the appended claims.

The invention claimed is:

1. A method for controlling transmission oil temperature, the method comprising:
    establishing a predetermined transmission oil reference temperature;
    measuring a current transmission oil temperature;
    establishing a transmission oil temperature differential by subtracting the current transmission oil temperature from the transmission oil reference temperature;
    establishing an engine power limit based on said transmission oil temperature differential; and
    limiting an output of an engine to said engine power limit to thereby limit said transmission oil temperature.

2. The method of claim 1, wherein said limiting an output of an engine includes altering the fuel consumption of said engine.

3. The method of claim 1, wherein said limiting an output of an engine includes altering the air intake of said engine.

4. The method of claim 1, wherein said limiting an output of an engine includes adjusting spark timing of said engine.

5. The method of claim 1, wherein said establishing an engine power limit includes calculating an engine output limit proportional to the transmission oil temperature differential.

6. The method of claim 1, wherein said establishing an engine power limit includes integrating the transmission oil temperature differential to calculate an engine output limit.

7. The method of claim 1, further comprising transmitting said engine power limit from a first control module to an engine control module via a serial communications datalink.

8. A method for controlling a powertrain temperature, the powertrain including a transmission and an engine, the transmission having transmission oil, the engine having engine coolant, the method comprising:
    establishing a predetermined transmission oil reference temperature;
    establishing a predetermined engine coolant reference temperature;
    measuring a current transmission oil temperature;
    measuring a current engine coolant temperature;
    establishing a transmission oil temperature differential by subtracting the current transmission oil temperature from the transmission oil reference temperature;
    establishing an engine coolant temperature differential by subtracting the current engine coolant temperature from the engine coolant reference temperature;
    establishing a minimum temperature differential by selecting the minimum of said transmission oil temperature differential and said engine coolant temperature differential;
    establishing an engine power limit based on said minimum temperature differential; and limiting engine output to said engine power limit to thereby limit said powertrain temperature.

9. The method of claim 8, wherein said limiting engine output includes altering the fuel consumption of said engine.

10. The method of claim 8, wherein said limiting engine output includes altering the air intake of said engine.

11. The method of claim 8, wherein said limiting engine output includes adjusting spark timing of said engine.

12. The method of claim 8, wherein said establishing an engine power limit includes calculating an engine output limit proportional to the minimum temperature differential.

13. The method of claim 8, wherein said establishing an engine power limit includes integrating the minimum temperature differential to calculate an engine output limit.

14. The method of claim 8, further comprising transmitting said engine power limit from a transmission control module to an engine control module via a serial communications datalinik.

15. A method for controlling a powertrain temperature, the powertrain including a transmission and an engine, the transmission having a transmission control module and transmission oil, the engine having an engine control module and engine coolant, the method comprising:

establishing a predetermined transmission oil reference temperature;

establishing a predetermined engine coolant reference temperature;

measuring a current transmission oil temperature;

measuring a current engine coolant temperature;

establishing a transmission oil temperature differential by subtracting the current transmission oil temperature from the transmission oil reference temperature;

establishing an engine coolant temperature differential by subtracting the current engine coolant temperature from the engine coolant reference temperature;

establishing a minimum temperature differential in the transmission control module by selecting the minimum of said transmission oil temperature differential and said engine coolant temperature differential;

establishing an engine power limit based on said minimum temperature differential;

transmitting said engine power limit from the transmission control module to the engine control module; and limiting engine output to said engine power limit.

16. The method of claim 15, wherein said limiting engine output includes altering the fuel consumption of said engine.

17. The method of claim 15, wherein said limiting engine output includes altering the air intake of said engine.

18. The method of claim 15, wherein said limiting engine output includes adjusting spark timing of said engine.

19. The method of claim 15, wherein said establishing an engine power limit includes calculating an engine output limit proportional to the minimum temperature differential.

20. The method of claim 15, wherein said establishing an engine power limit includes integrating the minimum temperature differential to calculate an engine output limit.

* * * * *